United States Patent [19]

Tokoro

[11] Patent Number: 4,774,917
[45] Date of Patent: Oct. 4, 1988

[54] PISTON AND PISTON RING FOR AN INTERNAL COMBUSTION ENGINE

[75] Inventor: Noriyuki Tokoro, Gotenba, Japan

[73] Assignee: Toyota Jidosha Kabushiki Kaisha, Aichi, Japan

[21] Appl. No.: 7,759

[22] Filed: Jan. 28, 1987

[30] Foreign Application Priority Data

Mar. 31, 1986 [JP] Japan .............................. 61-46295[U]

[51] Int. Cl.$^4$ .............................. F22B 5/00; F16J 1/01
[52] U.S. Cl. .................................. 123/193 P; 123/669; 92/212; 92/213; 92/214; 92/248
[58] Field of Search ......... 123/193 P, 193 R, 193 CP; 92/212, 213, 224, 248

[56] References Cited

U.S. PATENT DOCUMENTS

| | | |
|---|---|---|
| 3,583,293 | 6/1971 | De Biasse . |
| 3,738,231 | 6/1973 | Zurner . |
| 4,470,388 | 9/1984 | Showalter ........................ 123/193 P |
| 4,516,481 | 5/1985 | Geffroy et al. .............. 123/193 P X |
| 4,649,806 | 3/1987 | Harstock ....................... 123/193 P X |

FOREIGN PATENT DOCUMENTS

| | | |
|---|---|---|
| 47-6482 | 3/1972 | Japan . |
| 48-40602 | 12/1973 | Japan . |
| 55-108232 | 7/1980 | Japan . |
| 57-49536 | 3/1982 | Japan . |
| 57-49538 | 3/1982 | Japan . |
| 59-91447 | 6/1984 | Japan . |

*Primary Examiner*—Larry Jones
*Attorney, Agent, or Firm*—Parkhurst, Oliff & Berridge

[57] ABSTRACT

An internal combustion engine includes a cylinder block, a piston and a piston ring. The cylinder block includes at least one cylinder bore which includes a cylinder bore surface. The piston is located within the cylinder bore of the cylinder block so as to be displaceable upwardly and downwardly in the longitudinal direction of the cylinder bore. The piston includes at least one annular groove which has at least one inclined surface such that a bottom of the annular groove is located lower than an outer edge of the annular groove. The piston ring includes an outer peripheral portion and an inner peripheral portion. The inner peripheral portion of the piston ring is located within the annular groove of the piston for sliding engagement with the inclined surface of the annular groove of the piston. An inner edge of the inner peripheral portion of the piston ring is located apart from the bottom of the annular groove of the piston, and the outer peripheral portion of the piston ring is in contact with the cylinder bore surface of the cylinder block.

23 Claims, 7 Drawing Sheets

PISTON AND PISTON RING FOR AN INTERNAL COMBUSTION ENGINE

BACKGROUND OF THE INVENTION

The present invention relates to an internal combustion engine including a cylinder block and a piston. The cylinder block includes at least one cylinder bore, and the piston is located in the cylinder bore. The piston includes at least one annular groove, and a piston ring is inserted into the annular groove of the piston.

More particularly, the present invention relates to improvements in the piston ring and the annular groove of the piston for preventing a top portion of the piston from being melted by heat in a combustion chamber.

Japanese Utility Model Laid Open Application No. 57-49536 discloses a conventional engine with a cylinder bore in a cylinder block and a piston. A top piston ring is inserted into a top annular groove of the piston, and the piston with the top piston ring is located in the cylinder bore. The top piston ring has an "L" cross-sectional shape (i.e., the top piston ring includes an outer peripheral portion and an inner peripheral portion). The outer peripheral portion extends upwardly in the longitudinal direction of the cylinder bore, and the inner peripheral portion extends in the lateral direction of the cylinder bore. A top portion of the outer peripheral portion of the top piston ring is located at substantially the same level as a top surface of the piston. The outer peripheral portion of the top piston ring surrounds a top land of the piston.

Accordingly, heat in a combustion chamber is transmitted to the piston and then to the cylinder block through the top piston ring. As a result, the top piston ring prevents the top land of the piston from being melted by heat in the combustion chamber. Nonetheless, this arrangement suffers from a substantial disadvantage.

When the piston is displaced upwardly and air is compressed in the combustion chamber, the compressed air pushes against the top piston ring. The inner peripheral portion of the top piston ring is not displaced downwardly because the lower surface of the top annular groove of the piston extends perpendicular to the longitudinal direction of the cylinder bore, and the inner peripheral portion of the top piston ring is pushed against the lower surface of the top annular groove. However, the outer peripheral portion of the top piston ring is pushed against a cylinder bore surface of the cylinder bore by the compressed air in the combustion chamber (i.e., the outer peripheral portion of the top piston ring is pushed into tight contact with the cylinder bore surface). As a result, when the piston is displaced along the longitudinal direction of the cylinder bore, excessive friction is caused between the outer peripheral portion of the top piston ring and the cylinder bore surface of the cylinder bore. Energy of the internal combustion engine is necessarily expended to overcome this friction.

SUMMARY OF THE INVENTION

The present invention was developed in view of the foregoing background and to overcome the foregoing drawback. It is accordingly an object of this invention to provide an engine which prevents a top portion of a piston from being melted by heat in a combustion chamber, and which reduces friction between a piston ring and a cylinder bore.

The engine of the present invention includes a cylinder block, a piston and a piston ring. The cylinder block includes at least one cylinder bore, and the cylinder bore includes a cylinder bore surface. The piston includes at least one annular groove, and the piston is located within the cylinder bore of the cylinder block. The piston is displaced up and down in the longitudinal direction of the cylinder bore. The annular groove includes at least one inclined surface such that a bottom of the annular groove is lower than an outer edge of the annular groove.

The piston ring includes an outer peripheral portion and an inner peripheral portion. The inner peripheral portion of the piston ring is located within the annular groove of the piston, and an inner edge of the piston ring is located apart from the bottom of the annular groove of the piston. The outer peripheral portion of the piston ring is in contact with the cylinder bore surface of the cylinder block.

Accordingly, when compressed air pushes against the outer peripheral portion of the piston ring, the piston ring is displaced along the inclined surface defined within the piston. As a result, friction is reduced between the outer peripheral portion of the piston ring and the cylinder bore surface of the cylinder block.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate various preferred embodiments according to the present invention.

Figure 1:
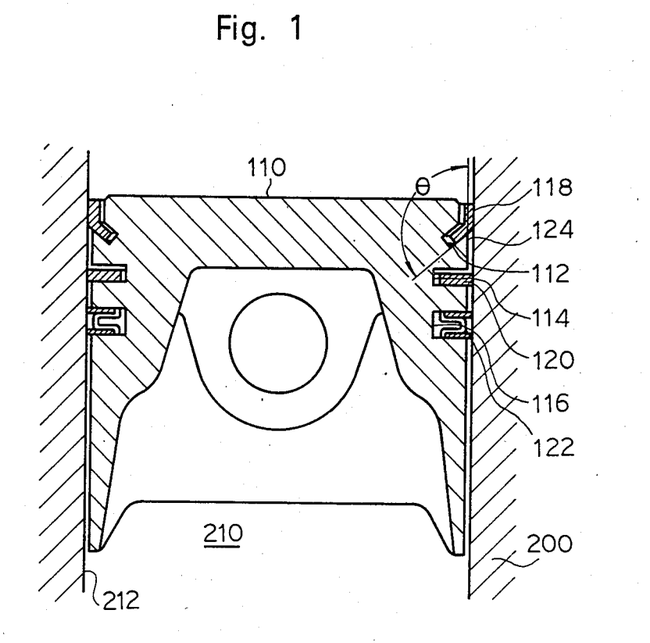
FIG. 1 is a cross-sectional view of a piston according to a first embodiment of the present invention, wherein a top piston ring, a second piston ring and an oil ring are assembled to the piston and in contact with a surface of a cylinder bore.

Referring to FIG. 1, a piston 110 for an internal combustion engine (not shown in drawings) mounted on a vehicle (not shown in drawings) includes a top annular groove 112, a second annular groove 114 and a third annular groove 116 on a peripheral side surface 124 of the piston 110. A lower surface of the top annular groove 112 is inclined from the peripheral side surface 124 of the piston 110 by an angle "$\theta$". The piston 110 is made from aluminum. The piston 110 is located within a cylinder bore 210 of a cylinder block 200, and the piston 110 is displaceable up and down in the longitudinal direction of the cylinder bore 210. The cylinder bore 210 includes a cylinder bore 212. The peripheral side surface 124 of the piston 110 is not in contact with the cylinder bore surface 212.

A top piston ring 118 is inserted into the top annular groove 112 and a second piston ring 120 is inserted into the second annular groove 114. An oil ring 122 is inserted into the third annular groove 116. Inner peripheral edges of the top and second piston rings 118 and 120 and the oil ring 122 are located apart from bottoms of the top, second and third annular grooves 112, 114 and 116.

Diameters of the top and second piston rings 118 and 120 and the oil ring 122 in disassembled condition are greater than a diameter of the cylinder bore 210. The top and second piston rings 118 and 120 and the oil ring 122 are made from elastic material. Accordingly, when the top and second piston rings 118 and 120 and the oil ring 122 are assembled within the cylinder bore 210 on the piston 110, outer peripheral portions of the top and second piston rings 118 and 120 and the oil ring 122 are adequately in contact with the cylinder bore surface 212 of the cylinder bore 210. Further, inner peripheral portions of the top and second piston rings 118 and 120 and the oil ring 122 are located within the top, second and third annular grooves 112, 114 and 116, respectively, for sliding engagement with surfaces thereof.

Figure 2:
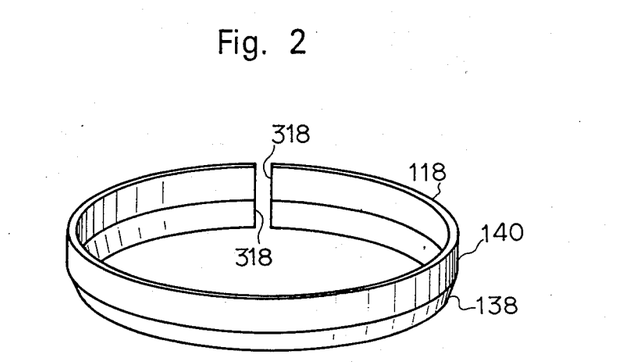
FIG. 2 is a perspective view of the top piston ring of FIG. 1.

As shown in FIG. 2, in disassembled condition, the top piston ring 118 includes a pair of ends 318 which are located apart from each other by a predetermined interval, so that when the top piston ring 118 is assembled with the piston 110 in the cylinder bore 210, the predetermined interval between the pair of ends 318 is decreased. The outer peripheral portion 140 of the top piston ring 118 is biased against the cylinder bore surface 212 of the cylinder bore 210 by the force of restitution of the elastic material. In a similar manner, each of the second piston ring 120 and the oil ring 122 includes a pair of ends, and the outer peripheral portions of the second ring 120 and the oil ring 122 are biased against the cylinder bore surface 212 of the cylinder bore 210.

Accordingly, an upper portion of the cylinder bore 210 is separated from a lower portion of the cylinder bore 210 by the piston 110 with the top and second piston rings 118 and 120 and the oil ring 122. The upper portion of the cylinder bore 210 communicates with a combustion chamber (not shown in drawings). Further, the top piston ring 118 includes outer and inner peripheral portions 140 and 138, and the inner peripheral portion 138 is inclined with respect to the outer peripheral portion 140 by an angle of 120 degrees. It is apparent that the inner peripheral portion 138 is inclined with respect to the outer peripheral portion 140 by an angle of more than 90 degrees and less than 150 degrees. The top piston ring 118 has a predetermined thickness "t". It is apparent that the inner peripheral portion 138 of the top piston ring 118 may be tapered.

Figure 3:
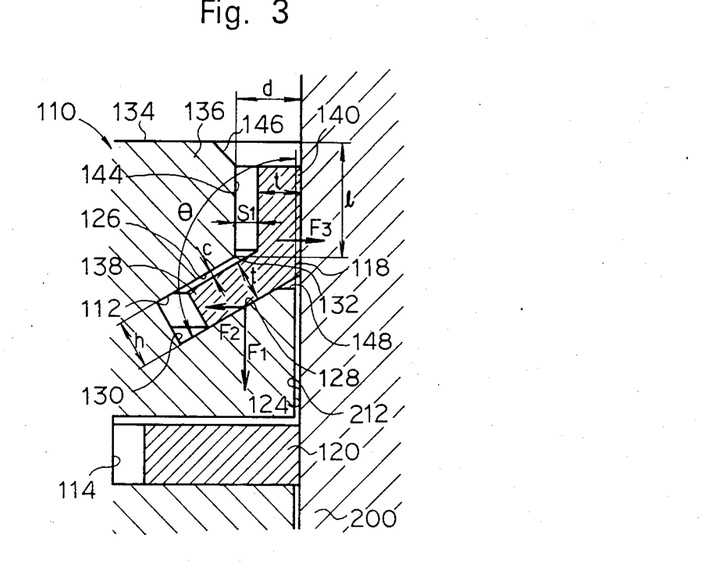
FIG. 3 is an enlarged cross-sectional view of the top piston ring, a portion of the piston and a portion of the cylinder block of FIG. 1, wherein the top piston ring is positioned at a first position.
Figure 4:
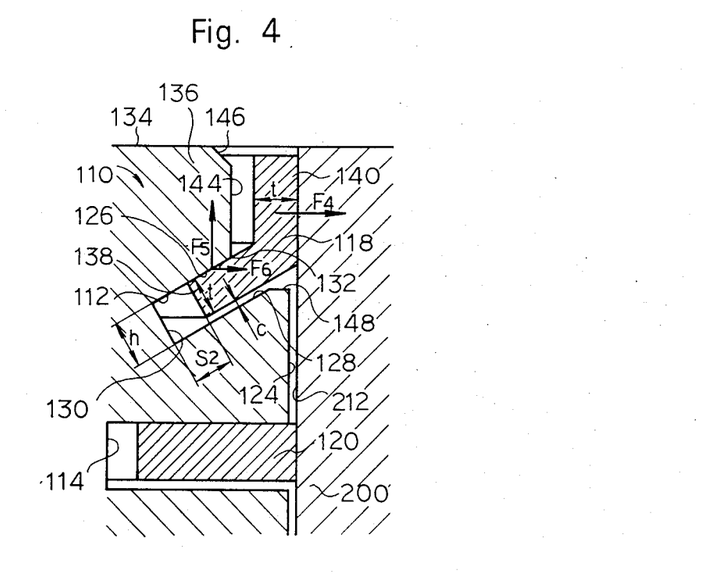
FIG. 4 is an enlarged cross-sectional view of the top piston ring, a portion of the piston and a portion of the cylinder block of FIG. 1, wherein the top piston ring is positioned at a second position.
Figure 5:
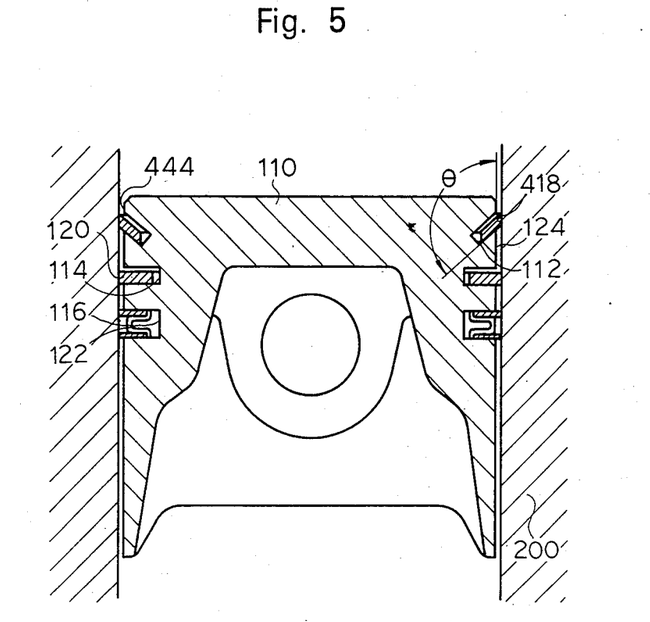
FIG. 5 is a cross-sectional view of a piston according to a second embodiment of the present invention.
Figure 6:
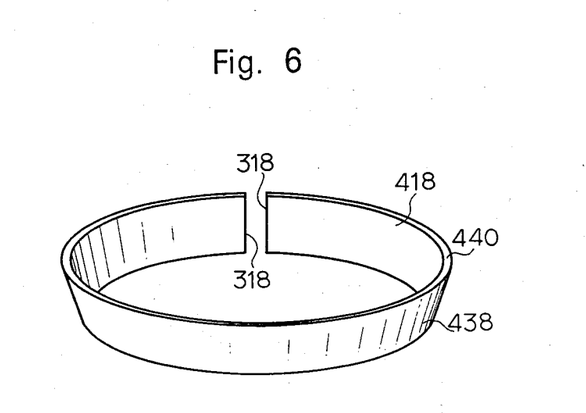
FIG. 6 is a perspective view of the top piston ring of the second embodiment.
Figure 7:
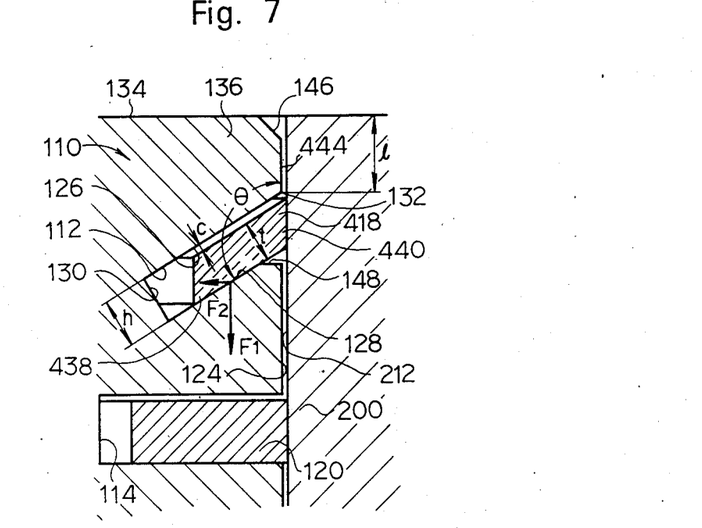
FIG. 7 is an enlarged cross-sectional view of the top piston ring, a portion of the piston and a portion of the cylinder block of the second embodiment, wherein the top piston ring is positioned at a first position.
Figure 8:
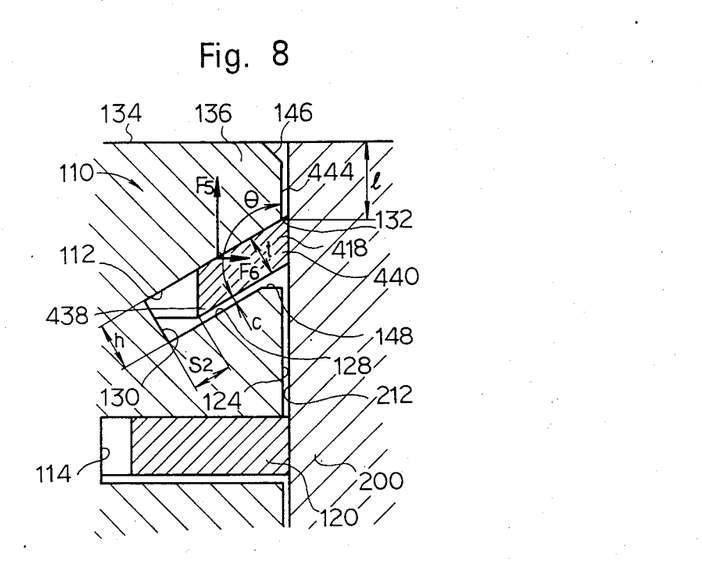
FIG. 8 is an enlarged cross-sectional view of the top piston ring, a portion of the piston and a portion of the cylinder block of the second embodiment, wherein the top piston ring is positioned at a second position.
Figure 9:
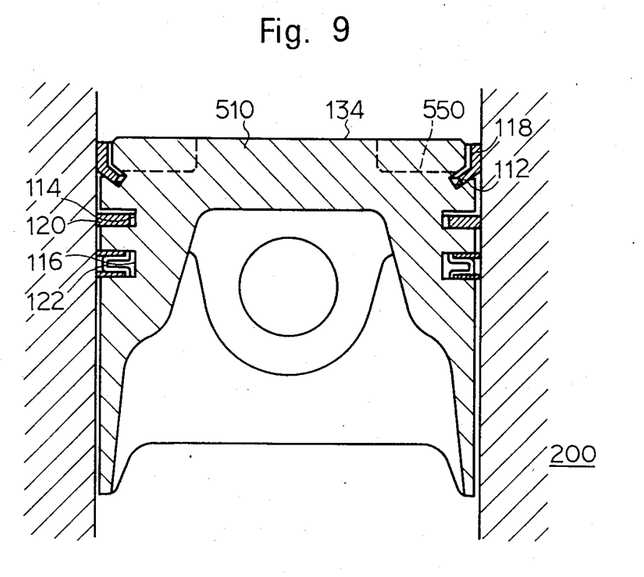
FIG. 9 is a cross-sectional view of a piston according to a third embodiment of the present invention.
Figure 10:
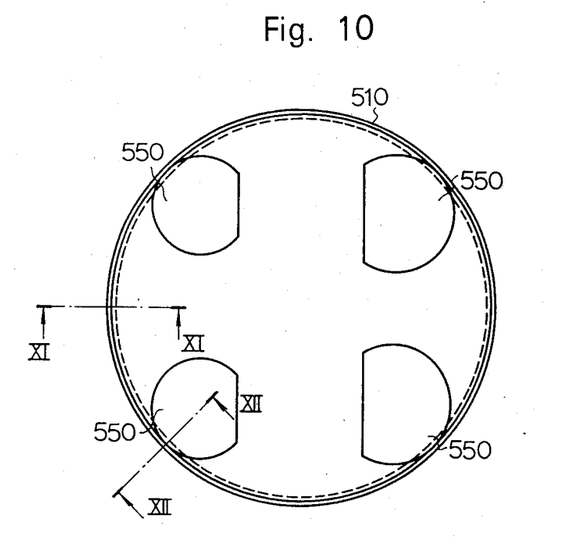
FIG. 10 is a top view of the piston of the third embodiment.
Figure 11:
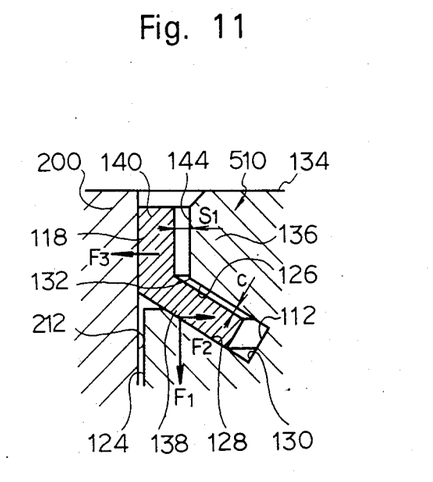
FIG. 11 is an enlarged cross-sectional view taken along the line XI—XI in FIG. 10, wherein the top piston ring is positioned at a first position.
Figure 12:
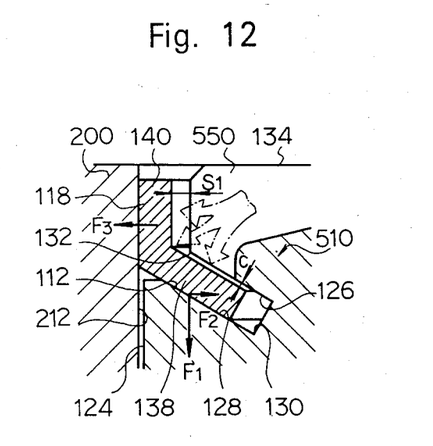
FIG. 12 is an enlarged cross-sectional view taken along the line XII—XII in FIG. 10, wherein the top piston ring is positioned at the first position.

As shown in FIGS. 3 and 4, the top annular groove 112 is defined on the peripheral side surface 124 of the piston 110, and the top annular groove 112 includes an upper inclined surface 126 and a lower inclined surface 128. The piston 110 includes an upper peripheral side surface 144 which is substantially parallel to the peripheral side surface 124. The lower inclined surface 128 is inclined with respect to the peripheral side surface 124 by an angle "$\theta$". The angle "$\theta$" corresponds to the angle defined between the outer and inner peripheral portions 140 and 138 on the top piston ring 118. The preferred angle is 120 degrees, but the angle may be from any angle greater than 90 degrees but less than 150 degrees.

The upper inclined surface 126 of the top annular groove 112 is substantially parallel to the lower inclined surface 128. An interval "h", defined between the upper and lower inclined surfaces 126 and 128, is greater than the thickness "t" of the inner peripheral portion 138 of the top piston ring 118. It is apparent that the shape of the top annular groove 112 may correspond to the shape of the inner peripheral portion 138 of the top piston ring 118 (i.e., when the inner peripheral portion 138 of the top piston ring 118 has a tapered cross sectional shape, the top annular groove 112 may have a "V" cross sectional shape). Accordingly, as shown in FIG. 3, a clearance "C" is defined between the upper inclined surface 126 of the top annular groove 112 and the inner peripheral portion 138 of the top piston ring 118. A bottom 130 of the top annular groove 112 is spaced from an inner peripheral edge of the top piston ring 118 by an interval "$S_2$".

A boundary line 132 is defined between a lower edge of the upper peripheral side surface 144 and an outer edge of the upper inclined surface 126 of the piston 110. The boundary line 132 is located apart from a top surface 134 of the piston 110 by a distance "l". When a diameter of the piston 110 is 86 mm, the preferred distance "l" of the piston 110 for a gasoline engine is 3 mm, and the preferred distance "l" of the piston 110 for a diesel engine is 8 mm. It is apparent that when the diameter of the piston 110 varies between 70 mm and 100 mm, the distance "l" of the piston 110 for the gasoline engine may be varied between 2 mm and 5 mm, and distance "l" of the piston 110 for the diesel engine may be varied between 5 mm and 8 mm.

A first chamfer 146 is defined between an upper edge of the upper peripheral side surface 144 and an outer edge of the top surface 134 of the piston 110, and the first chamfer 146 is inclined with respect to the top surface 134 of the piston 110 by an angle of 45 degrees. A second chamfer 148 is also defined between an outer edge of the lower inclined surface 128 and an upper edge of the peripheral side surface 124 of the piston 110, and the second chamfer 148 is inclined with respect to the peripheral side surface 124 by an angle of 90 degrees.

Accordingly, a top land 136 has a longitudinal distance in the longitudinal direction of the cylinder bore 210, defined between the top surface 134 and the upper inclined surface 126 of the piston 110 in an inner portion of the piston 110, which longitudinal distance is greater than the distance "l". As a result, the top land 136 has higher resistance to heat in the combustion chamber than that of the conventional piston.

The upper peripheral side surface 144 of the piston 110 is separated from the cylinder bore surface 212 of the cylinder block 200 by a distance "d". The distance "d" is greater than the thickness "t" of the outer peripheral portion 140 of top piston ring 118. Accordingly, in assembled condition (i.e., the outer peripheral portion 140 of the top piston ring 118 is adequately in contact with the cylinder bore surface 212 of the cylinder bore 210), the outer peripheral portion 140 of the top piston ring 118 is located apart from the upper peripheral side surface 144 of the piston 110 by an interval "$S_1$". The outer peripheral portion 140 of the top piston ring 118 extends upwardly to a lower edge of the first chamfer 146 of the piston 110. It is apparent that the outer peripheral portion 140 of the top piston ring 118 may extend upwardly to the top surface 134 of the piston 110. Further, the outer peripheral portion 140 of the top piston ring 118 surrounds the top land 136 of the piston 110.

Accordingly, the heat in a combustion chamber of the internal combustion engine is transmitted to the piston 110 and the top piston ring 118, and is then transmitted to the cylinder block 200 through the top piston ring 118. Thus, the top piston ring 118 prevents the top land 136 of the piston 110 from being melted by the heat in the combustion chamber of the internal combustion engine.

Further, a space defined between the upper peripheral side surface 144 of the piston 110 and the outer peripheral portion 140 of the top piston ring 118 is small, because the distance "l" of the upper peripheral side surface 144 of the piston 110 is smaller than that of the conventional piston. Accordingly, the amount of combustible gas remaining in the space is minimized, so that when the combustible gas in the combustion chamber of the engine is burned, the amount of non-burned combustible gas remaining in the combustion chamber is minimized.

The function of the top piston ring 118 and the top annular groove 112 of the piston 110 are described hereinafter.

When the piston 110 is displaced upwardly in the longitudinal direction of the cylinder bore 210, the combustible gas is compressed in the combustion chamber of the engine. As shown in FIG. 3, when the compressed combustible gas pushes the top piston ring 118 downwardly in the longitudinal direction of the cylinder bore 210 by first longitudinal force "$F_1$" (i.e., the top piston ring 118 is positioned at a first position), the top piston ring 118 first moves smoothly downwardly along the lower inclined surface 128, and then first divided force "$F_2$" of the longitudinal force "$F_1$" is caused in the lateral direction of the cylinder bore 210, thereby forcing the top piston ring 118 to move toward the inside of the piston 110. Further, first lateral force "$F_3$" is caused on the top piston ring 118, because the compressed combustible gas pushes the top piston ring 118 outwardly in the lateral direction of the cylinder bore 210 with the force of restitution of the top piston ring 118.

Accordingly, even when the outer peripheral portion 140 of the top piston ring 118 is pushed against the cylinder bore surface 212 of the cylinder bore 210 by the lateral force "$F_3$", the first divided force "$F_2$" reduces the lateral force "$F_3$". Thus, the first divided force "$F_2$" prevents excessive contact between the cylinder bore surface 212 of the cylinder block 200 and the outer peripheral portion 140 of the top piston ring 118. As a result, friction is reduced between the outer peripheral portion 140 of the top piston ring 118 and the cylinder bore surface 212 of the cylinder bore 210.

Further, when the compressed combustible gas is ignited in the combustion chamber, the piston 110 and the top piston ring 118 are pushed downwardly in the longitudinal direction of the cylinder bore 210 by explosion. In this condition, the divided force "$F_2$" is caused in the lateral direction of the cylinder bore 210, and the top piston ring 118 is forced to the inside of the piston 110 by the divided force "$F_2$". Accordingly, the lateral force "$F_3$", caused by the force of restitution of the top piston ring 118 and explosion of the combustible gas, is reduced by the first divided force "$F_2$. As a result, friction is reduced between the outer peripheral portion 140 of the top piston ring 118 and the cylinder bore surface 212 of the cylinder bore 210.

On the other hand, as shown in FIG. 4, when the piston 110 is displaced downwardly in the longitudinal direction of the cylinder bore 210 to introduce the combustible gas into the combustion chamber of the engine, the combustion chamber has an atmospheric depression. Adequate friction is caused between the outer peripheral portion 140 of the top piston ring 118 and the cylinder bore surface 212 of the cylinder bore 210 by the force of restitution of the top piston ring 118. Accordingly, the inner peripheral portion 138 of the top piston ring 118 is in contact with and pushes against the upper inclined surface 126 of the top annular groove 112 by second longitudinal force "$F_5$" (i.e., the top piston ring 118 is positioned at a second position). As a result, the top piston ring 118 first moves upwardly smoothly along the upper inclined surface 126, and then second divided force "$F_6$" of the second longitudinal force "$F_5$" is caused in the lateral direction of the cylinder bore 210, thereby forcing the top piston ring 118 to move toward the outside of the piston 110.

Accordingly, the second divided force "$F_6$" and the second lateral force (force of restitution) "$F_4$" of the top piston ring 118 force the top piston ring 118 to move toward the outside of the piston ring 110 (the second divided force "$F_6$" increases the lateral force caused by the force of restitution "$F_4$" of the top piston ring 118). As a result, even when the combustion chamber has a high atmospheric depression, the outer peripheral portion 140 of the top piston ring 118 is securely in contact with the cylinder bore surface 212 of the cylinder bore 210. Thus, the top piston ring 118 prevents communication between the combustion chamber and the lower portion of the cylinder bore 210.

FIGS. 5 through 8 show a second embodiment of the present invention. The second embodiment is similar to the first embodiment disclosed in FIGS. 1 through 4. However, an upper peripheral side surface 444 of the piston 110 is aligned with the peripheral side surface 124 of the piston 110, and the lower inclined surface 128 of the top annular groove 112 is inclined with respect to the upper peripheral side surface 444 of the piston 110 by the angle "θ".

A distance "l" of the second embodiment, defined between the top surface 134 of the piston 110 and the line 132, is shorter than that of the first embodiment shown in FIGS. 3 and 4. A top piston ring 418 includes an outer peripheral portion 440 and an inner peripheral portion 438. The outer peripheral portion 440 of the top piston ring 418 is aligned with the inner peripheral portion 438 of the top piston ring 418. The outer peripheral portion 440 is in contact with the cylinder bore surface 212 of the cylinder bore 210. Manufacture of the top piston ring 418 of the second embodiment is easier than that of the first embodiment.

FIGS. 9 through 12 show a third embodiment of the present invention. The third embodiment is substantially similar to the first embodiment disclosed in FIGS. 1 through 4. However, a piston 510 includes a plurality of valve recesses 550 on the top surface 134 thereof. The valve recesses 550 prevent valves located within the combustion chamber from contacting the top surface 134 of the piston 110. The valve recesses 550 communicate with the top annular groove 112 of the piston 110.

Figure 13:
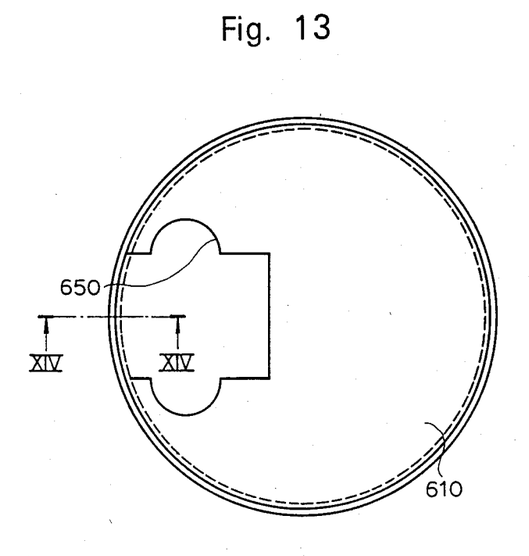
FIG. 13 is a top view of a piston according to a fourth embodiment of the present invention.
Figure 14:
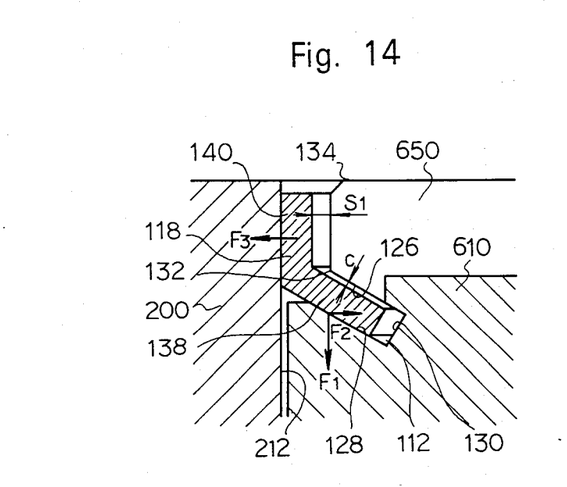
FIG. 14 is an enlarged cross-sectional view taken along the line XIV—XIV in FIG. 13, wherein the top piston ring is positioned at a first position.

FIGS. 13 and 14 show a fourth embodiment of the present invention. The fourth embodiment is substantially similar to the third embodiment disclosed in FIGS. 9 through 12. However, a piston 610 includes a gas guide groove 650 on the top surface 134 thereof. The gas guide groove 650 creates air turbulence in the combustion chamber. The gas guide groove 650 communicates with the top annular groove 112 of the piston 110.

When the gas guide groove 650 creates the air turbulence in the combustion chamber, the air flow hits the top piston ring 118 and pushes the top piston ring 118 against the lower inclined surface 128 of the top annular groove 112 and the cylinder bore surface 212 of the cylinder bore 210. Accordingly, first divided force "$F_2$" of first longitudinal force "$F_1$" is caused in the lateral direction of the cylinder bore 210. The first lateral force "$F_3$", caused by force of restitution of the top piston ring 118 and the air flow in the combustion chamber, is reduced by the first divided force "$F_2$".

As described herein, the present invention overcomes the shortcomings of the known art by providing an engine which prevents a top portion of a piston from being melted by heat in a combustion chamber, and which reduces friction between a piston ring and a cylinder bore. While the present invention has been described in its preferred embodiments, it is to be understood that the invention is not limited thereto, and may be otherwise embodied within the scope of the following claims.

What is claimed is:

1. An internal combustion engine comprising:
a cylinder block having at least one cylinder bore, the cylinder bore having an inner cylinder bore surface;
a piston located within the cylinder bore of the cylinder block, so as to be displaceable upwardly and downwardly in the longitudinal direction of the cylinder bore, said piston including at least one annular groove having upper and lower surfaces, at least said lower surface being an inclined surface such that a bottom of the annular groove is lower than an outer edge of the annular groove; and
a piston ring including an outer peripheral portion and an inner peripheral portion, the inner peripheral portion of said piston ring being located within the annular groove of said piston for sliding engagement with the inclined surface of the annular groove of said piston, an inner edge of said inner peripheral portion of said piston ring being located apart from the bottom of the annular groove of said piston and below the outer edge of the annular groove, and the outer peripheral portion of said piston ring being in contact with the cylinder bore surface of said cylinder block.

2. The engine of claim 1, wherein the annular groove includes an upper inclined surface and a lower inclined surface, a distance between the upper and lower inclined surfaces of the annular groove being greater than a thickness of the inner peripheral portion of said piston ring, whereby when the piston is displaced upwardly in the longitudinal direction of the cylinder bore, the inner peripheral portion of said piston ring is in contact with the lower inclined surface of the annular groove of said piston.

3. The engine of claim 2, wherein the inner peripheral portion of said piston ring is inclined with respect to the outer peripheral portion of said piston ring by an angle corresponding to an angle defined between a lower peripheral side surface of said piston and the lower inclined surface of the annular groove, the inner peripheral portion of said piston ring being inserted into the annular groove, and the outer peripheral portion extending in the longitudinal direction of the cylinder bore from the inner peripheral portion of said piston ring.

4. The engine of claim 3, wherein the piston further comprises an upper peripheral side surface substantially parallel to the lower peripheral side surface, the annular groove separating the upper peripheral side surface from the lower peripheral side surface, a distance between the upper and lower peripheral side surfaces in the lateral direction of the cylinder bore being greater than a thickness of the outer peripheral portion of said piston ring.

5. The engine of claim 4, wherein an upper edge of the outer peripheral portion of said piston ring is located in the vicinity of a top surface of said piston.

6. The engine of claim 2, wherein the outer peripheral portion of said piston ring is aligned with the inner peripheral portion of said piston ring.

7. The engine of claim 2, wherein the piston includes at least one recess defined on a top surface of said piston, the recess communicating with the annular groove of the piston.

8. An internal combustion engine comprising:
a cylinder block having at least one cylinder bore, the cylinder bore having an inner cylinder bore surface;
a piston located within the cylinder bore not in contact with the cylinder bore surface, said piston being displaceable upwardly and downwardly in the longitudinal direction of the cylinder bore, said piston including a top annular groove with an outer edge which is located adjacent to a top surface of said piston, said annular groove having upper and lower surfaces, at least said lower surface being an inclined surface such that a bottom of the top annular groove is lower from the top surface of said piston than the outer edge of the top annular groove; and a top piston ring including an outer peripheral portion and an inner peripheral portion, the inner peripheral portion of said top piston ring being located within the top annular groove of said piston for sliding engagement with the inclined surface of the annular groove of said piston, an inner edge of said inner peripheral portion of said top piston ring being located apart from the bottom of the top annular groove of said piston and below the outer edge of the annular groove, and the outer peripheral portion of said top piston ring being in contact with the cylinder bore surface of said cylinder block.

9. The engine of claim 8, wherein the top annular groove includes an upper inclined surface and a lower inclined surface, a distance between the upper and lower inclined surfaces of the top annular groove being greater than a thickness of the inner peripheral portion of said top piston ring, whereby when the piston is displaced upwardly in the longitudinal direction of the cylinder bore, the inner peripheral portion of said top piston ring is in contact with the lower inclined surface of the annular groove of said piston.

10. The engine of claim 9, wherein the inner peripheral portion of said top piston ring is inclined with respect to the outer peripheral portion of said top piston ring by an angle corresponding to an angle defined between a lower peripheral side surface of said piston and the lower inclined surface of the top annular groove, the inner peripheral portion of said top piston ring being inserted into the top annular groove, and the outer peripheral portion of said top piston ring extending in the longitudinal direction of the cylinder bore from the inner peripheral portion of said top piston ring.

11. The engine of claim 10, wherein the piston further comprises an upper peripheral side surface substantially parallel to the lower peripheral side surface, the top annular groove separating the upper peripheral side surface from the lower peripheral side surface, a distance between the upper and lower peripheral side surfaces in the lateral direction of the cylinder bore being greater than a thickness of the outer peripheral portion of said top piston ring.

12. The engine of claim 11, wherein an upper edge of the outer peripheral portion of said top piston ring is located in the vicinity of a top surface of said piston.

13. The engine of claim 9, wherein the outer peripheral portion of said top piston ring is aligned with the inner peripheral portion of said top piston ring.

14. The engine of claim 9, wherein the piston includes at least one recess defined on a top surface of said piston, the recess communicating with the top annular groove of the piston.

15. An internal combustion engine comprising:
a cylinder block having at least one cylinder bore, the cylinder bore having an inner cylinder bore surface;
a piston located within the cylinder bore not in contact with the cylinder bore surface, said piston being displaceable upwardly and downwardly in the longitudinal direction of the cylinder bore, said piston including at least one annular groove with an outer edge which is located adjacent to a top surface of said piston, said annular groove having upper and lower surfaces, at least said lower surface being a smooth inclined surface such that a bottom of the annular groove is lower from a top of said piston that the outer edge of the annular groove; and a top piston ring including an outer peripheral portion and an inner peripheral portion, the inner peripheral portion of said piston ring being located within the annular groove of said piston for sliding engagement with the smooth inclined lower surface of the annular groove of said piston, an inner edge of said inner peripheral portion of said piston ring being located apart from the bottom of the top annular groove of said piston and below the outer edge of the annular groove, and the outer peripheral portion of said piston ring being in contact with the cylinder bore surface of said block, whereby when compressed air pushes against the outer peripheral portion of said piston ring, said piston ring is displaced along the smooth inclined surface of said annular groove so as to reduce friction between the outer peripheral portion of said piston ring and the cylinder bore surface of said cylinder block.

16. The engine of claim 15, wherein the annular groove includes an upper inclined surface and a lower inclined surface, a distance between the upper and lower inclined surfaces of the annular groove being greater than a thickness of the inner peripheral portion of said piston ring, whereby when the piston is displaced upwardly in the longitudinal direction of the cylinder bore, the inner peripheral portion of said piston ring is in contact with the lower inclined surface of the annular groove of said piston.

17. The engine of claim 16, wherein the inner peripheral portion of said piston ring is inclined with respect to the outer peripheral portion of said piston ring by an angle corresponding to an angle defined between a lower peripheral side surface of said piston and the lower inclined surface of the annular groove, the inner peripheral portion of said piston ring being inserted into the annular groove, and the outer peripheral portion extending in the longitudinal direction of the cylinder bore from the inner peripheral portion of said piston ring.

18. The engine of claim 17, wherein an upper edge of the outer peripheral portion of said piston ring is located in the vicinity of a top surface of said piston.

19. The engine of claim 16, wherein the outer peripheral portion of said piston ring is aligned with the inner peripheral portion of said piston ring.

20. The engine of claim 16, wherein the piston includes at least one recess defined on a top surface of said piston, the recess communicating with the annular groove of the piston.

21. An internal combustion enging comprising:
a cylinder block combustion engine having at least one cylinder bore, the cylinder bore having an inner cylinder bore surface;
a piston located within the cylinder bore of the cylinder bock, so as to be displaceable in a vertical direction in the longitudinal direction of the cylinder bore, said piston including at least one annular groove having upper and lower inclined surfaces such that a bottom of the annular groove is lower than an outer edge of the annular groove, the annular groove separating an upper peripheral side surface of the piston from a lower peripheral side surface of the piston, the lower peripheral side surface being substantially parallel to the upper peripheral side surface; and a piston ring including an outer peripheral portion and an inner peripheral portion, a first thickness of the inner peripheral portion of the piston ring being less than a width of the annular groove defined between the upper and lower inclined surfaces of the annular groove to define a first space between the inner peripheral portion of the piston ring and the annular groove, the inner peripheral portion of said piston ring being located within the annular groove of said piston for sliding selectively in engagement with one of the upper and lower inclined surfaces of the annular groove of said piston, an inner edge of said inner peripheral portion of said piston ring being located apart from the bottom of the annular groove of said piston, and the outer peripheral portion of said piston ring being in contact with the cylinder bore surface of said cylinder block, a second thickness of the outer peripheral portion of the piston ring being less than a lateral distance defined between the upper and lower peripheral side surfaces of the piston to define a second space between the upper peripheral side surface of the piston and the outer peripheral portion of the piston ring, the second space being accessible from a top of the piston, the piston ring being displaceable within the annular groove of the piston in the vertical direction of the piston while the outer peripheral portion of piston ring is slidable on the cylinder bore.

22. An internal combustion engine comprising:
a cylinder block having at least one cylinder bore, the cylinder bore having an inner cylinder bore surface;
a piston located within the cylinder bore not in contact with the cylinder bore surface, said piston being longitudinally displaceable in a vertical direction of the cylinder bore, said piston including a top annular groove with an outer edge which is located adjacent to a top surface of said piston, said annular groove having upper and lower inclined surfaces such that a bottom of the top annular groove is lower from the top surface of said piston than the outer edge of the top annular groove, the annular groove separating an upper peripheral side surface of the piston from a lower peripheral side surface of the piston, the lower peripheral side surface being substantially parallel to the upper peripheral side surface; and
a top piston ring including an outer peripheral portion and an inner peripheral portion, a first thickness of the inner peripheral portion of the piston ring being less than a width of the annular groove defined between the upper and lower inclined surfaces of the annular groove to define a first space between the inner peripheral portion of the piston ring and the the annular groove, the inner peripheral portion of said top piston ring being located within the top annular groove of said piston for selective sliding engagement with one of the upper and lower inclined surfaces of the top annular groove of said piston, an inner edge of said inner peripheral portion of said top piston ring being located apart from the bottom of the top annular groove of said piston, and the outer peripheral portion of said top piston ring being in contact with the cylinder bore surface of said cylinder block, a second thickness of the outer peripheral portion of the piston ring being less than a lateral distance defined between the upper and lower peripheral side surfaces of the piston to define a second space between the upper peripheral side surface of the piston and the outer peripheral portion of the piston ring, the second space being accessible from a top of the piston, the piston ring being displaceable within the annular groove of the piston in the vertical direction of the piston while the outer peripheral portion of piston ring is slidable on the cylinder bore.

23. An internal combustion engine comprising:
a cylinder block having at least one cylinder bore, the cylinder bore having an inner cylinder bore surface;
a piston located within the cylinder bore not in contact with the cylinder bore surface, said piston being displaceable in a vertical direction in the longitudinal direction of the cylinder bore, said piston including at least one annular groove with an outer edge which is located adjacent to a top surface of said piston, said annular groove having upper and lower smooth inclined surfaces such that a bottom of the annular groove is lower than the outer edge of the annular groove, the annular groove separating an upper peripheral side surface of the piston from a lower peripheral side surface of the piston, the lower peripheral side surface being substantially parallel to the upper peripheral side surface; and
a piston ring including an outer peripheral portion and an inner peripheral portion, a first thickness of the inner peripheral portion of the piston ring being less than a width of the annular groove defined between the upper and lower inclined surfaces of the annular groove to define a first space between the inner peripheral portion of the piston ring and the annular groove, the inner peripheral portion of said piston ring being located within the annular groove of said piston for selective sliding engagement with one of the upper and lower smooth inclined surfaces of the annular groove of said piston, an inner edge of said inner peripheral portion of said piston ring being located apart from the bottom of the annular groove of said piston and the outer peripheral portion of said piston ring being in contact with the cylinder bore surface of said cylinder block, a second thickness of the outer peripheral portion of the piston ring being less than a lateral distance defined between the upper and lower peripheral side surfaces of the piston to define a second space between the upper peripheral side surface of the piston and the outer peripheral portion of the piston ring, the second space being accessible from a top of the piston, the piston ring being displaceable within the annular groove of the piston in the vertical direction of the piston while the outer peripheral portion of piston ring is slidable on the cylinder bore, whereby when compressed air pushes against the outer peripheral portion of said piston ring, said piston ring is displaced along the smooth inclined surfaces of said annular groove so as to reduce friction between the outer peripheral portion of said piston ring and the cylinder bore surface of said cylinder block.

* * * * *